United States Patent
Schlingmann et al.

(10) Patent No.: US 11,186,142 B2
(45) Date of Patent: Nov. 30, 2021

(54) ENGINE HSG LOADING FOR RAPID CABIN WARMUP

(71) Applicants: Hyundai Motor Company, Seoul (KR); Kia Motors Corporation, Seoul (KR)

(72) Inventors: Dean Schlingmann, San Dimas, CA (US); Ryan Miller, Chino, CA (US)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 311 days.

(21) Appl. No.: 16/416,226

(22) Filed: May 19, 2019

(65) Prior Publication Data

US 2020/0361286 A1   Nov. 19, 2020

(51) Int. Cl.

| B60H 1/03 | (2006.01) |
|---|---|
| B60H 1/04 | (2006.01) |
| F02N 19/10 | (2010.01) |
| B60W 20/15 | (2016.01) |
| B60H 1/00 | (2006.01) |
| F02B 63/04 | (2006.01) |

(52) U.S. Cl.
CPC ............... *B60H 1/03* (2013.01); *B60H 1/004* (2013.01); *B60H 1/04* (2013.01); *B60W 20/15* (2016.01); *F02N 19/10* (2013.01); *F02B 63/04* (2013.01)

(58) Field of Classification Search
CPC .. B60H 1/004; B60H 1/03; B60H 1/04; F02N 19/10; F02B 63/04
See application file for complete search history.

(56) References Cited

U.S. PATENT DOCUMENTS

| 4,762,170 | A | * | 8/1988 | Nijjar | B60H 1/00421 |
| | | | | | 123/142.5 R |
| 5,291,960 | A | * | 3/1994 | Brandenburg | B60W 10/26 |
| | | | | | 180/65.27 |
| 6,607,142 | B1 | * | 8/2003 | Boggs | B60K 6/22 |
| | | | | | 180/65.1 |
| 7,069,983 | B2 | * | 7/2006 | Yakumaru | B60H 1/00899 |
| | | | | | 165/202 |
| 7,213,665 | B2 | | 5/2007 | Yamaguchi et al. | |
| 8,125,099 | B2 | * | 2/2012 | Flick | B60H 1/00642 |
| | | | | | 307/9.1 |
| 8,346,421 | B2 | | 1/2013 | Bryan et al. | |
| 8,371,512 | B2 | * | 2/2013 | Douarre | B60H 1/004 |
| | | | | | 237/2 B |
| 8,393,551 | B2 | * | 3/2013 | Nemesh | B60K 6/48 |
| | | | | | 237/12.3 B |
| 8,494,698 | B2 | | 7/2013 | Murata et al. | |

(Continued)

*Primary Examiner* — Steven B McAllister
*Assistant Examiner* — Daniel E. Namay
(74) *Attorney, Agent, or Firm* — Mintz Levin Cohn Ferris Glovsky and Popeo, P.C.; Peter F. Corless

(57) ABSTRACT

A method of rapidly increasing a temperature within a hybrid vehicle includes receiving an on input from a temperature control system after the vehicle engine has been turned on. In response to receiving the on input, an ambient temperature, a coolant temperature, and a battery state of charge are detected. When the ambient temperature is less than a predetermined threshold, the coolant temperature is less than a predetermined threshold, and the battery SOC is less than a predetermined threshold, a charge mode of the vehicle is changed to a charge increasing mode to thus increase the coolant temperature.

20 Claims, 4 Drawing Sheets

(56) References Cited

U.S. PATENT DOCUMENTS

| | | | | |
|---|---|---|---|---|
| 8,612,092 | B2* | 12/2013 | Okamoto | B60H 1/0073 |
| | | | | 701/36 |
| 9,170,585 | B2* | 10/2015 | Flick | G05D 23/1905 |
| 9,758,171 | B2* | 9/2017 | Martini | B60W 30/194 |
| 9,776,469 | B1* | 10/2017 | Smith | B60W 50/082 |
| 2001/0039230 | A1* | 11/2001 | Severinsky | B60L 7/26 |
| | | | | 477/3 |
| 2005/0167169 | A1* | 8/2005 | Gering | F01P 3/20 |
| | | | | 237/12.3 B |
| 2010/0019048 | A1* | 1/2010 | Flick | B60H 1/00814 |
| | | | | 236/51 |
| 2010/0019049 | A1* | 1/2010 | Flick | B60H 1/00642 |
| | | | | 236/51 |
| 2010/0023210 | A1* | 1/2010 | Flick | B60W 10/06 |
| | | | | 701/36 |
| 2015/0102118 | A1* | 4/2015 | Hirabayashi | B60H 1/3213 |
| | | | | 237/12.3 R |
| 2015/0283914 | A1* | 10/2015 | Malone | B60J 7/0573 |
| | | | | 701/49 |
| 2015/0298523 | A1* | 10/2015 | Patel | B60H 1/00964 |
| | | | | 237/2 A |
| 2016/0137030 | A1* | 5/2016 | Leone | B60H 1/00885 |
| | | | | 237/5 |
| 2016/0332520 | A1* | 11/2016 | Miller | B60L 50/16 |
| 2016/0362110 | A1* | 12/2016 | Martini | B60W 10/30 |
| 2017/0182860 | A1* | 6/2017 | Miyakoshi | B60H 1/32 |
| 2017/0253105 | A1* | 9/2017 | Allgaeuer | B60H 1/00385 |
| 2018/0029439 | A1* | 2/2018 | Jeong | B60W 10/30 |
| 2018/0281556 | A1* | 10/2018 | Koberstein | B60H 1/004 |
| 2019/0111761 | A1* | 4/2019 | Jaglan | B60H 1/00964 |

* cited by examiner

ENGINE HSG LOADING FOR RAPID CABIN WARMUP

BACKGROUND

1. Field of the Disclosure

The present disclosure relates to vehicle cabin warmup, and more particularly, to engine hybrid starter-generator loading that increases the temperature within a hybrid vehicle.

2. Description of the Related Art

Environmentally friendly vehicles such as, hybrid vehicles, are being developed to enhance fuel efficiency and reduce exhaust gas. Hybrid vehicles use an engine and an electric motor as power sources to accomplish such enhancement. The engine generates power to drive the vehicle and provides heat to increase the temperature within the vehicle. Specifically, as the engine is warmed up, waste heat from coolant within the engine is used to heat a vehicle cabin by transferring the heat energy to a vehicle temperature control system.

However, during a start of the vehicle when the outdoor temperature is particularly cold (e.g., cold start), the engine within the hybrid vehicle takes much longer to reach an operating temperature, and the generated waste heat may be insufficient to increase the temperature within the vehicle. An additional heater has thus typically been used to provide additional heating for the vehicle cabin. For example, the additional heater may be in the form of a seat heat system, a steering wheel heating system, a heat-pump system, and the like. That is, when the coolant temperature is low, an additional heater is operated to provide an increased temperature feeling to a driver. The use of such an additional heater, however, decreases the state of charge of a battery within the vehicle since the battery is discharged when the heater is used which in turn deteriorates fuel consumption. Additionally, the seat heating and steering wheel heating system do not actually provide an increased cabin temperature but instead merely provide a warmth feeling to a user.

Accordingly, various techniques have been developed to increase the temperature within the vehicle during such cold temperatures without requiring an additional heater. For example, one developed technique includes delaying the start of the engine based on a detected coolant temperature and the state of a temperature system switch. In other words, the engine is not started until the engine has been sufficiently preheated. However, such a technique is unable to cope with heating the vehicle cabin when the engine has already been started since it is based on an engine start delay.

Another developed technique detects fluid temperature from powertrain elements within the hybrid vehicle to determine if engine energy is needed to heat the vehicle cabin. However, such a technique does not consider the ambient temperature outside the vehicle. Additionally, many techniques of the prior art rely on operating the engine in an idle mode to heat the vehicle cabin which substantially increases the time required for heating. Thus, there is a need for a technique that provides more rapid vehicle heating during colder temperatures.

SUMMARY

The present disclosure provides a method and system of rapidly increasing the temperature of a vehicle cabin by converting a charge sustaining or depleting mode to charge increasing mode to operate the engine in a loaded condition and increase the engine coolant temperature more rapidly than when the engine is in an idle mode, the heat energy of which may be transported into the vehicle cabin through a temperature control system.

According to one aspect of the present disclosure, a method of increasing a temperature within a hybrid vehicle is provided. In particular, the method may include receiving, by an engine control unit (ECU), an on input from a temperature control system after an ignition switch of the vehicle has been turned on. In response to receiving the on input, an ambient temperature and a coolant temperature may be detected using a sensor unit. Additionally, a state of charge (SOC) of a battery mounted within the vehicle may be detected. In response to determining that the ambient temperature is less than a predetermined threshold, the coolant temperature is less than a predetermined threshold, and the SOC of the battery is less than a predetermined threshold, the charge sustaining or depleting mode of the vehicle may be converted to a charge increasing mode to increase a temperature of a coolant within the engine.

The charge increasing mode may include applying a torque to the engine to increase the coolant temperature and charge the battery. In particular, the converting of the charge mode may include transmitting a signal to a hybrid control unit (HCU) to convert the charge mode. The ECU may be configured to receive a motor torque load from the HCU and apply the motor torque load to the engine to increase the engine coolant temperature. The heated coolant may then be circulated through the temperature control system to increase the temperature within the vehicle.

An example of the predetermined threshold of the ambient temperature may be about 20 F. The on input may be received in response to a user temperature setting input which may be greater than a current temperature within the vehicle. The battery SOC may be detected from a signal received from a battery management system (BMS). Additionally, the sensor unit may include an ambient temperature sensor mounted outside the vehicle and a coolant temperature sensor mounted within the engine.

Further, the method may include converting the charge mode to an initial charge depleting mode, when the ambient temperature is greater than the predetermined threshold, the coolant temperature is greater than the predetermined threshold, or the SOC of the battery is greater than the predetermined threshold. The method may also include continuously detecting the ambient temperature, the coolant temperature, and the SOC of the battery in response to receiving the on input. Accordingly, the method may continuously determine whether the ambient temperature is less than the predetermined threshold, the coolant temperature is less than the predetermined threshold, and the SOC of the battery is less than the predetermined threshold to determine whether to convert the charge mode to the charge increasing mode.

According to another aspect of the present disclosure, a hybrid vehicle is provided that may include an engine disposed within the vehicle and configured to generate power for driving the vehicle or power for charging a battery within the vehicle. A hybrid starter-generator (HSG) may be configured to provide torque to the engine and a temperature control system may be configured to output heat from an engine coolant circulating therethrough to a vehicle cabin. A sensor unit may be configured to measure an ambient temperature outside the vehicle and a temperature of the coolant within the engine. The vehicle may further include a battery management system configured to output a state of charge (SOC) of a battery within the vehicle to a controller.

Further, the controller may be configured to receive an on input from the temperature control system after the engine has been turned on and in response, determine whether the ambient temperature is less than a predetermined threshold, the coolant temperature is less than a predetermined threshold, and the battery SOC is less than a predetermined threshold. The controller may be configured to convert the charge mode of the vehicle to charge increasing mode to increase a temperature of the coolant in response to determining that the ambient temperature is less than the predetermined threshold, the coolant temperature is less than the predetermined threshold, and the SOC of the battery is less than the predetermined threshold.

According to yet another aspect of the present disclosure, a system for increasing a temperature within a vehicle is provided. In particular, the system may include a controller having a memory that stores program instructions and a processor configured to execute the program instructions. The program instructions when executed may be configured to receive an on input from a temperature control system after an engine of the vehicle has been turned on. Additionally, the program instructions when executed may be configured to detect an ambient temperature and a coolant temperature using a sensor unit and a SOC of battery mounted within the vehicle in response to receiving the on input. In response to determining that the ambient temperature is less than a predetermined threshold, the coolant temperature is less than a predetermined threshold, and the battery SOC is less than a predetermined threshold, the program instructions may be configured to convert a charge mode of the vehicle to a charge increasing mode to increase a temperature of a coolant within the engine.

Notably, the present disclosure is not limited to the combination of the seat system elements as listed above and may be assembled in any combination of the elements as described herein.

Other aspects of the disclosure are disclosed infra.

BRIEF DESCRIPTION OF THE DRAWINGS

The above and other objects, features, and advantages of the present disclosure will be more apparent from the following detailed description taken in conjunction with the accompanying drawings, in which.

Throughout the accompanying drawings, the same reference numerals will be used to denote the same components.

LISTING OF REFERENCE NUMERALS

Figure 1:
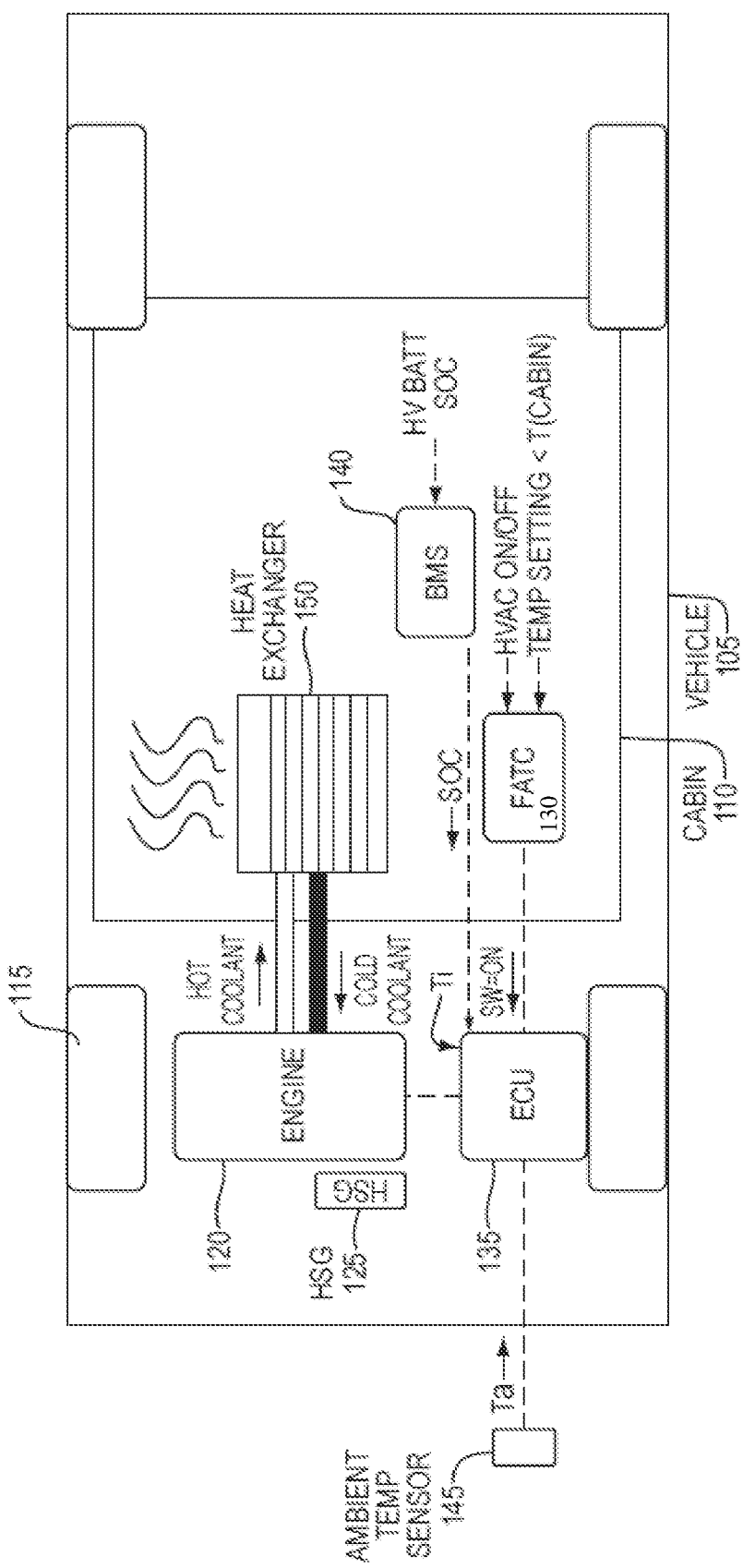
FIG. 1 illustrates a hybrid vehicle according to an exemplary embodiment of the present disclosure.

105: vehicle
110: cabin
115: wheels
120: engine
125: hybrid starter-generator (HSG)
130: full automatic temperature controller (FATC)
135: engine control unit (ECU)
140: battery management system (BMS)
145: ambient temperature sensor
150: heat exchanger
155: hybrid control unit (HCU)
205: battery
210: clutch
215: motor
220: transmission
225: differential gear (FD)

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present disclosure provides a method of more rapidly increasing the temperature within a cabin of a hybrid vehicle. The heating within a hybrid vehicle is accomplished using engine coolant which transports waste heat to a heating ventilation and air-conditioning (HVAC) system within the vehicle. Conventionally, the engine is operated in an idle mode in which it is decoupled from a powertrain to thus heat the coolant. This process, however, requires a substantial amount of time. That is, the techniques of the prior art operate the vehicle in a charge depleting or sustaining mode which operates the engine unloaded (or partially loaded) while the battery provides power until the battery state of charge (SOC) threshold is met. The present disclosure, however, provides a method of more rapidly increasing the coolant temperature to thus more rapidly transfer the heat energy to the HVAC system and heat the vehicle cabin.

Particularly, the present disclosure provides a process that involves receiving an input request via a full automatic temperature controller (FATC) during colder ambient temperature conditions. Then, using ambient and engine coolant temperature sensors as well as a hybrid battery state of charge (SOC), a controller within the vehicle forces a hybrid starter-generator (HSG) to load the engine by applying a motor torque, which causes charging of the battery. This differentiates from the conventional operation of the engine in an idle mode where the engine is unloaded to produce waste heat. Accordingly, the present disclosure is capable of causing the engine to warm up faster than during an idle mode by providing a method of enabling a charge increasing mode to load the engine.

Referring specifically to an aspect of the present disclosure and as shown in FIG. 1, the vehicle 105 may include a cabin 110 (e.g., an occupant space within the vehicle), a plurality of wheels 115, and an engine 120. A hybrid starter-generator (HSG) 125 is also provided in FIG. 1 and is connected to the engine to provide torque thereto which in turn allows for more heat generation by the engine, as will be described in further detail below.

As mentioned, the heat from the engine 120 is used to heat the cabin 110 of the vehicle 105. An engine control unit (ECU) 135 connected to the engine 120 may be configured to receive a plurality of sensor signals. In particular, as shown, an ambient temperature signal (Ta) may be received from a temperature sensor 145 disposed outside of the occupant cabin, an engine coolant temperature signal (Ti) may be received from a coolant temperature sensor disposed within the engine 120, and on input signal (SW=ON) may be received from a FATC 130. That is, the FATC heat unit (e.g., temperature control system) may be configured to receive an ON signal request from a user via a button or other input device. The SW=ON signal signifies that the user input request has been received (e.g., HVAC on/off request) and the temperature setting (e.g., the temperature set by the user) is more than a current temperature of the cabin.

Additionally, the ECU 135 may be configured to receive a state of charge (SOC) of a battery within the vehicle from a battery management system (BMS) 140. Then, a heat exchanger 150 allows air to absorb heat energy from hot coolant (e.g., coolant of increased temperature) transmitted from the engine 120. In particular, when the coolant reaches the HVAC system within the vehicle 105, it passes through the heat exchanger 150 mounted within the HVAC system and is blown into or distributed to the cabin 110 to increase occupant area temperature.

Figure 2:
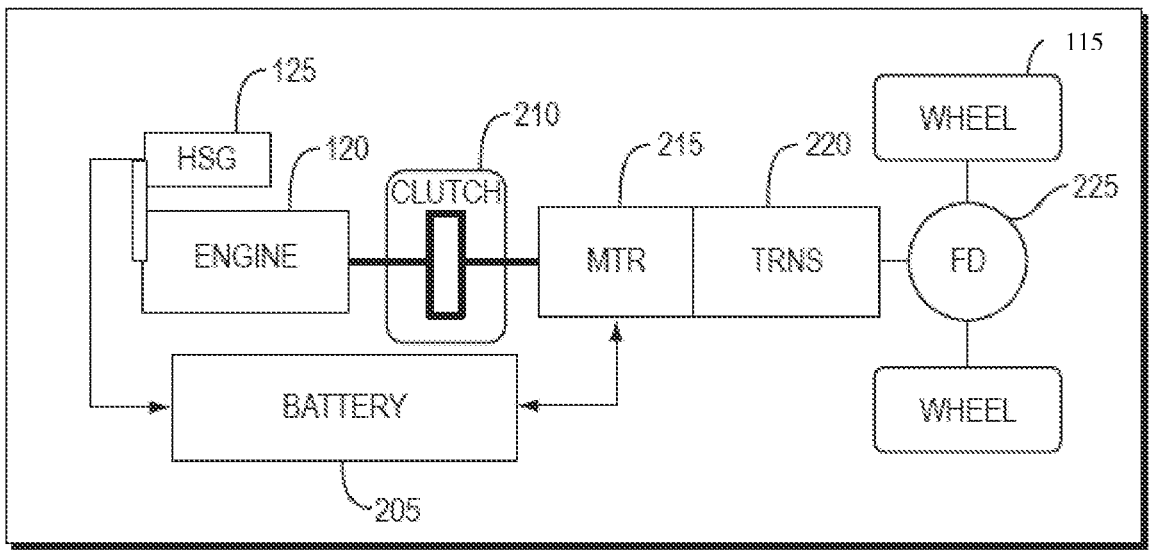
FIGS. 2-3 illustrate charge modes of a hybrid vehicle according to an exemplary embodiment of the present disclosure.
Figure 3:
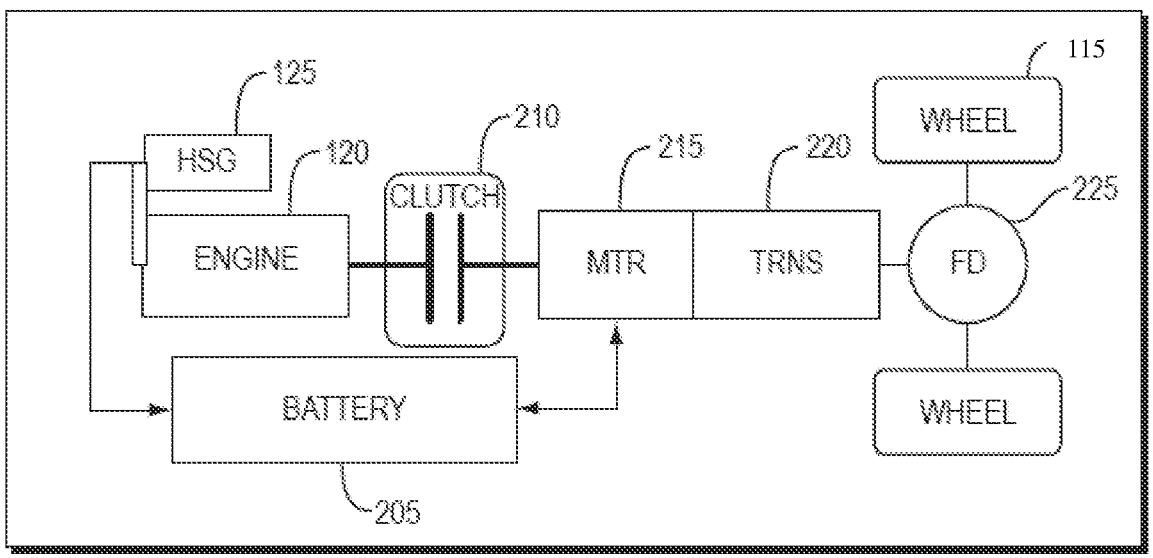

Moreover, the vehicle may be operated in a plurality of different charge modes based on whether the engine is to be operated. FIGS. 2 and 3 illustrate such exemplary charge modes. In particular, FIG. 2 illustrates an exemplary charge depleting mode in which the motor is outputting power. In the charge depleting mode, the engine clutch 210 is open and thus only the motor 215 is relied on for motive power and there is no loading by the HSG 125 onto the engine 120. That is, the engine is decoupled from the rest of the powertrain. The charge depleting mode may be referred to herein below as a default mode or an initial charge mode.

Further, FIG. 3 illustrates a charge sustaining mode in which both the engine 120 and motor 215 are used as power sources. That is, the battery 205 collects the energy generated by the HSG 125 and supplies the motor with energy. Additionally, as shown, the engine clutch 210 is closed in this charge mode to thus utilize the engine for power. In the charge sustaining mode, the engine is loaded primarily to provide motive power to the drive wheels, whereas, in a charge increasing mode, the engine is more actively engaged by utilizing an HSG torque command which reduces the time necessary to warm the engine coolant temperature. That is, in a charge increasing mode, the engine clutch 210 may be open or closed and the engine 120 is coupled to the HSG 125 via a drive belt/gear or other means. Accordingly, the HSG 125 is capable of torque loading the engine 120 and then the torque is converted to electrical energy and stored in the battery 205. This charge increasing mode will be discussed in further detail below and may be used to more rapidly increase the engine coolant and thus heat the vehicle cabin.

Typically, during colder ambient temperatures, a vehicle user or occupant may turn on a heating system, indicating that the engine coolant temperature is insufficient to raise the cabin temperature to a user requested or set temperature. In other words, when a user switches on an HVAC button or otherwise manipulates the HVAC and when a current temperature within the vehicle is less than a temperature setting, an on signal may be transmitted from the FATC to an ECU. In this scenario, when the ambient temperature is less than about 20 F and the battery SOC is insufficient (e.g., less than a critical percentage), a powertrain mode selection may be changed as will be discussed below in reference to FIG. 4.

Figure 4:
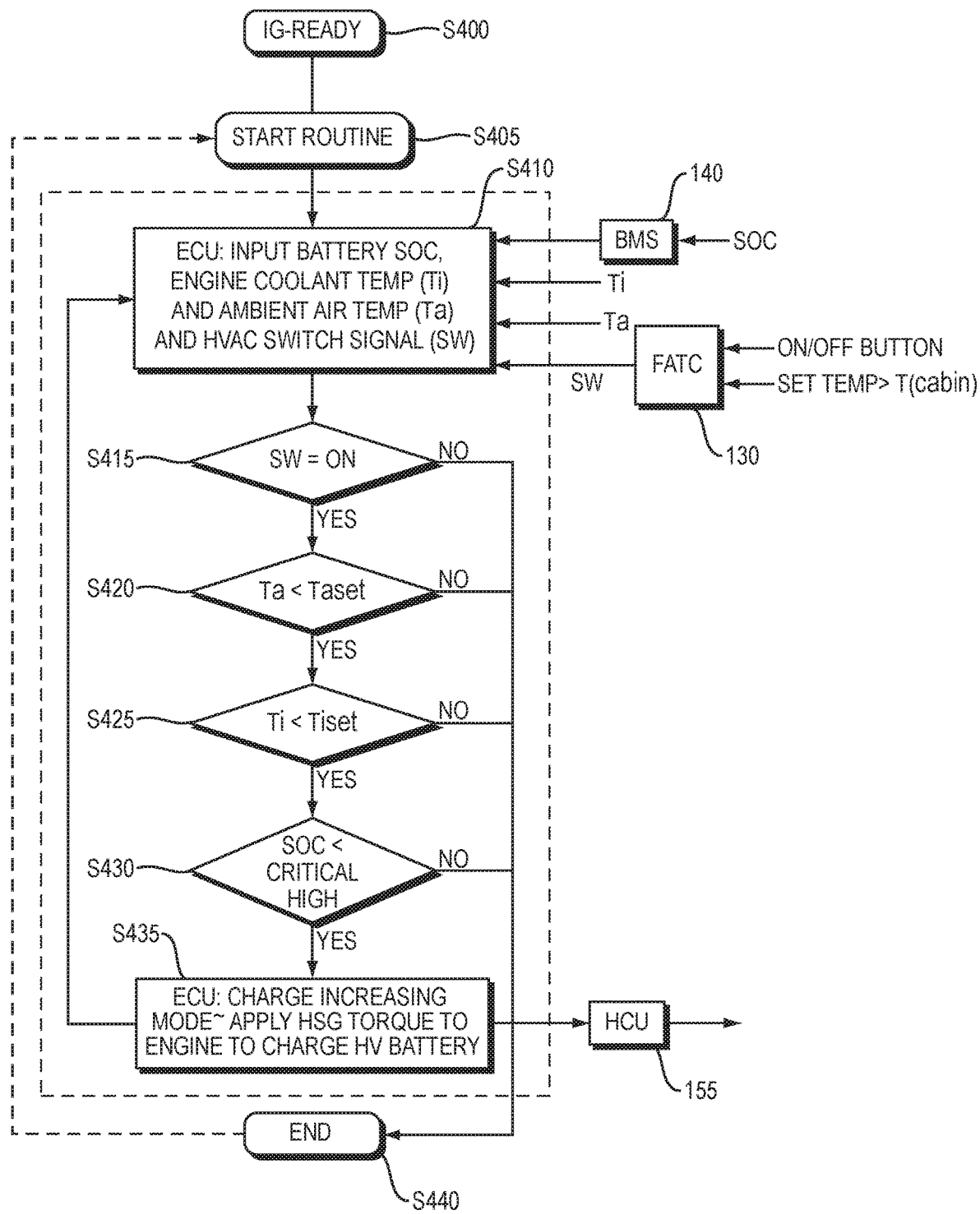
FIG. 4 illustrates a method for increasing a temperature within a hybrid vehicle according to an exemplary embodiment of the present disclosure.

FIG. 4 specifically illustrates a method for increasing a temperature within a hybrid vehicle according to an exemplary embodiment of the present disclosure. In particular, the method described herein may commence with the engine being turned on S400 (e.g., ignition (IG) ready). The method may be executed when the vehicle is in motion or when the vehicle is stationary. In response to the engine being turned on S400 (e.g., vehicle ignition switch turned on), the routine for cabin temperature increase may begin S405. In particular, the ECU may be configured to receive a battery SOC from the BMS, an engine coolant temperature (Ti), an ambient temperature (Ta), and an HVAC switch signal (SW) from the FATC S410. Each of these factors are considered to be the conditions for determining whether the charge mode is capable of being switched to the charge increasing mode. That is, the factors are not used to determine whether to turn on the engine as taught by conventional systems, but are used to determine whether the engine is capable of being loaded (e.g., whether an increased torque may be applied to the engine).

The method specifically determines whether each of the factors satisfies a predetermined threshold and when all the conditions satisfied, the charge mode change may be executed. Particularly, the method may include determining whether the HVAC switch signal is an on signal S415. The switch signal may be determined to be an on signal when the FATC receives both an on input at a temperature control setting or system input and when the FATC determines that the set temperature (e.g., temperature setting from a user) is greater than a current cabin temperature. If these two conditions are not satisfied, the switch signal may be determined to be 'off' and the process may be terminated S440.

However, if the switch signal is determined to be on, the method may proceed to determining whether the ambient temperature is less than a predetermined threshold S420. The predetermined threshold may be a threshold temperature of about 20 F, but the present disclosure is not limited thereto. If the temperature is greater than about 20 F, the process may be terminated S440. However, if the temperature is less than 20° F., the method may proceed to determining whether the engine coolant temperature is less than a predetermined threshold S425. In particular, the predetermined threshold may be a threshold temperature of about 140 F, but the present disclosure is not limited thereto. If the engine coolant temperature is greater than the predetermined threshold, the process may be terminated S440.

However, if the engine coolant temperature is less than the predetermined threshold, the method may proceed to determining whether the battery SOC is less than a predetermined threshold S430. The predetermined threshold may indicate a critically high SOC such as, about 95%, but the present disclosure is not limited thereto. If the SOC of the battery is greater than the predetermined threshold, the process may be terminated S440. When the SOC of the battery is less than the predetermined threshold, the method may proceed to changing the charge mode. Notably, the order of the determination of the above conditions is not particularly limited and the temperature and SOC conditions may be determined in any order or simultaneously.

Accordingly, when all the above-described conditions are satisfied based on the comparison with the thresholds, the ECU may be configured to change the charge mode from an initial charge mode to a charge increasing mode S435. The initial charge mode may be a charge depleting or sustaining mode. Particularly, the method may include transmitting a signal to a hybrid control unit (HCU) 155 to apply HSG torque to the engine to thus charge the hybrid vehicle battery. The engine is thus forced to receive high loading as opposed to the conventional process of allowing an engine to warm up while idle. This engagement of the engine in turn increases the engine coolant temperature more rapidly, allowing a more rapid transfer of heat energy to the FATC to then be transmitted to the vehicle cabin.

Additionally, after the charge mode has been changed to the charge increasing mode S435, the method may return to receiving the plurality of factors including the battery SOC, engine coolant temperature, ambient temperature, and HVAC switch signal S410. Thus, the factors may be continuously detected by the ECU and the process may be repeated each time all the conditions are satisfied. Once any of the above-described conditions of the factors are not satisfied, the charge mode may be changed back to the charge depleting mode (or charge sustaining mode). For example, when the engine coolant temperature becomes greater than the threshold temperature but all the other conditions remain satisfied, the ECU may be configured to return the charge mode to an initial charge mode (e.g., charge depleting or sustaining mode). Similarly, during the continuous monitoring of the factors, when the engine coolant temperature then decreases back down to less than the threshold temperature, the ECU may again be configured to change the charge mode to the charge increasing mode to thus rapidly increase the cabin temperature. The process is not limited to any particular number of cycles and is thus capable of continuously satisfying a user requested temperature setting more rapidly than the method of the prior art.

Figure 5A:
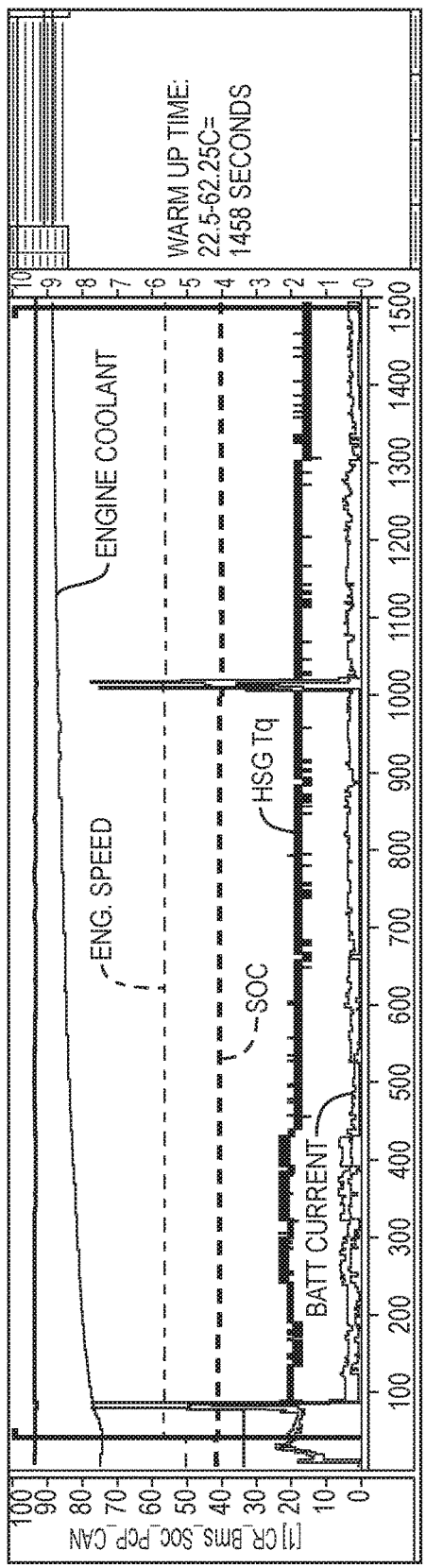
FIG. 5A-5B illustrate test results showing the rapid temperature increase within a hybrid vehicle according to an exemplary embodiment of the present disclosure.
Figure 5B:
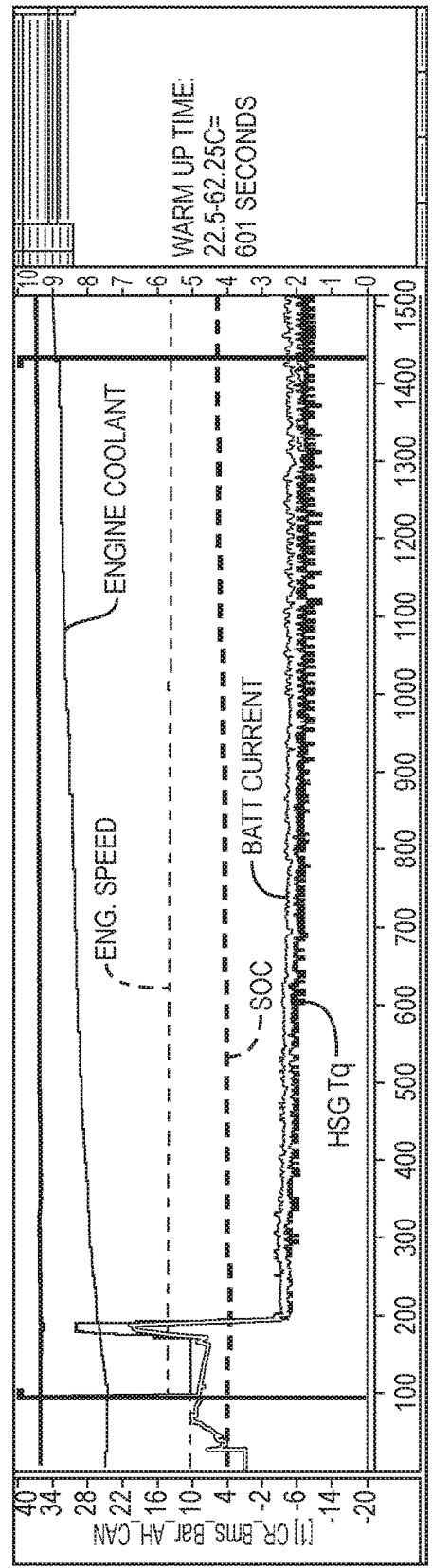

FIGS. 5A and 5B illustrate test results showing the rapid temperature increase within a hybrid vehicle according to an exemplary embodiment of the present disclosure. In particular, FIG. 5A illustrates engine warm up while the engine is unloaded and operated in an idle mode and FIG. 5B illustrates engine warm up while the engine is loaded (e.g., charge increasing mode). Each graph displays the engine speed, engine coolant, the HSG torque, battery SOC, and the battery current. As shown, the graph in FIG. 5B is capable of increasing the coolant temperature to the same temperature of FIG. 5A but in half the time. In particular, the coolant temperature was raised to a particular temperature in about 24 minutes while the engine was unloaded versus about 10 minutes while the engine was loaded. These graphs illustrate the effective results provided by the method of the present disclosure in more rapidly increasing the temperature of a cabin vehicle.

Moreover, according to another exemplary embodiment of the present disclosure, when the vehicle is determined to be stationary and the ECU determines that the ambient temperature is less than the threshold temperature, the engine coolant temperature is less than the threshold temperature, the HVAC switch signal is an on signal, and the SOC is less than the predetermined threshold, a main traction motor may be used instead of an HSG. That is, the traction motor/generator may be used instead of (or in addition to) the HSG for engine loading. This process may be used when the vehicle is stationary to ensure motor torque control.

According to yet another exemplary embodiment of the present disclosure, the engine coolant temperature may be omitted from the factors in the method described above. Instead, the ECU may be configured to receive only the battery SOC and the ambient temperature factors. When the battery SOC is less than the predetermined threshold, the ambient temperature is less than the threshold temperature, and the HVAC switch signal is an on signal, the charge mode may be switched to the charge increasing mode as described above for a specific period of time. The process may be limited to a specific period of time to prevent the engine coolant temperature from decreasing substantially during vehicle operation.

As discussed above, the method and system of the present disclosure are capable of rapidly increasing the cabin temperature of a hybrid vehicle by operating in a charge increasing mode to more rapidly increase the temperature of engine coolant. The logic described herein is capable of being executed both when the vehicle is stationary and in motion and assumes that the engine is already started. The method thus allows the vehicle to change to a true engine-off electric vehicle (EV) mode in a shorter period of time from an initial vehicle start. Lastly, the claimed method also increases the all-electric range (AER) of the vehicle by simultaneously increasing the SOC of the battery within the vehicle.

Hereinabove, although the present disclosure is described by specific matters such as concrete components, and the like, the exemplary embodiments, and drawings, they are provided merely for assisting in the entire understanding of the present disclosure. Therefore, the present disclosure is not limited to the exemplary embodiment. Various modifications and changes may be made by those skilled in the art to which the disclosure pertains from this description. Therefore, the spirit of the present disclosure should not be limited to the above-described exemplary embodiments, and the following claims as well as all technical spirits modified equally or equivalently to the claims should be interpreted to fall within the scope and spirit of the disclosure.

What is claimed is:

1. A method of increasing a temperature within a hybrid vehicle, comprising:
receiving, by an engine control unit (ECU), an on input from a temperature control system after an engine of the vehicle has been turned on;
in response to receiving the on input, detecting an ambient temperature and a temperature of a coolant within the engine using a sensor unit and detecting a state of charge (SOC) of a battery mounted within the vehicle; and in response to determining that the ambient temperature is less than a predetermined threshold, the coolant temperature is less than a predetermined threshold, and the SOC of the battery is less than a predetermined threshold, converting a charge mode of the vehicle to a charge increasing mode to increase the coolant temperature.

2. The method of claim 1, wherein the charge increasing mode includes applying a torque load to the engine to more rapidly increase the coolant temperature and charge the battery.

3. The method of claim 1, wherein the converting of the charge mode includes:

transmitting, by the ECU, a signal to a hybrid control unit (HCU) to convert the charge mode to the charge increasing mode.

4. The method of claim 3, further comprising:

receiving, by the ECU, a motor torque load from the HCU; and applying the motor torque load to the engine to increase the coolant temperature, wherein the coolant of increased temperature is circulated through the temperature control system to increase the temperature within the vehicle.

5. The method of claim 1, wherein the predetermined threshold of the ambient temperature is about 20 F.

6. The method of claim 1, wherein the on input is received in response to a user temperature setting input.

7. The method of claim 6, wherein the temperature setting input is greater than a current temperature within the vehicle.

8. The method of claim 1, wherein the SOC of the battery is detected from a signal received from a battery management system (BMS).

9. The method of claim 1, wherein the sensor unit includes an ambient temperature sensor mounted outside the vehicle and a coolant temperature sensor mounted within the engine.

10. The method of claim 1, further comprising:

converting, by the ECU, the charge mode to an initial charge mode when the ambient temperature is greater than the predetermined threshold, the coolant temperature is greater than the predetermined threshold, or the SOC of the battery is greater than the predetermined threshold.

11. The method of claim 10, wherein the initial charge mode is a charge depleting or charge sustaining mode.

12. The method of claim 1, further comprising:

continuously detecting the ambient temperature, the coolant temperature, and the SOC of the battery in response to receiving the on input; and continuously determining whether the ambient temperature is less than the predetermined threshold, the coolant temperature is less than the predetermined threshold, and the SOC of the battery is less than the predetermined threshold to determine whether to convert the charge mode to the charge increasing mode.

13. A hybrid vehicle, comprising:

an engine disposed within the vehicle and configured to generate power for driving the vehicle or power for charging a battery within the vehicle;

a hybrid starter-generator (HSG) configured to provide torque to the engine;

a temperature control system configured to output heat from a coolant, received from the engine and circulating therethrough, to a vehicle cabin;

a sensor unit configured to measure an ambient temperature outside the vehicle and a temperature of the coolant within the engine; and a controller configured to:

receive an on input from the temperature control system after the engine has been turned on;

determine whether the ambient temperature is less than a predetermined threshold, the coolant temperature is less than a predetermined threshold, and a state of charge (SOC) of the battery is less than a predetermined threshold; and convert a charge mode of the vehicle to a charge increasing mode to increase a temperature of the coolant in response to determining that the ambient temperature is less than the predetermined threshold, the coolant temperature is less than the predetermined threshold, and the SOC of the battery is less than the predetermined threshold.

14. The hybrid vehicle of claim 13, wherein the predetermined threshold of the ambient temperature is about 20 F.

15. The hybrid vehicle of claim 13, further comprising:

a battery management system configured to output the SOC of the battery to the controller.

16. The hybrid vehicle of claim 13, wherein the charge increasing mode includes applying an HSG torque to the engine to increase the coolant temperature and charge the battery.

17. The hybrid vehicle of claim 13, wherein the temperature control system includes a heat exchanger configured to transfer heat from the coolant to the vehicle cabin.

18. The hybrid vehicle of claim 13, wherein the controller is further configured to:

convert the charge mode to a charge depleting or sustaining mode when the ambient temperature is greater than the predetermined threshold, the coolant temperature is greater than the predetermined threshold, or the SOC of the battery is greater than the predetermined threshold.

19. A system for increasing a temperature within a vehicle, comprising:

a controller having a memory that stores program instructions and a processor configured to execute the program instructions, the program instructions when executed configured to:

receive an on input from a temperature control system after an engine of the vehicle has been turned on;

in response to receiving the on input, detect an ambient temperature and a temperature of a coolant within the engine using a sensor unit and detect a state of charge (SOC) of a battery mounted within the vehicle; and in response to determining that the ambient temperature is less than a predetermined threshold, the coolant temperature is less than a predetermined threshold, and the SOC of the battery is less than a predetermined threshold, convert a charge mode of the vehicle to a charge increasing mode to increase the coolant temperature.

20. The system of claim 19, wherein the program instructions when executed are further configured to:

convert the charge mode to a charge depleting or sustaining mode when the ambient temperature is greater than the predetermined threshold, the coolant temperature is greater than the predetermined threshold, or the SOC of the battery is greater than the predetermined threshold, in response to receiving the engine on input.

* * * * *